United States Patent
Sèguin et al.

(10) Patent No.: US 8,104,811 B2
(45) Date of Patent: Jan. 31, 2012

(54) STICK OPERABLE HOOKING DEVICE

(75) Inventors: Paul Antoine Sèguin, Boucherville (CA); Pierre Beaulieu, Vaudreuil sur le Lac (CA); Sébastien Riopel, Beaconsfield (CA); Yves Thibault, Sabrevois (CA); Yves Vermette, Saint-Jérôme (CA); Bertrand Legrand, Blainville (CA)

(73) Assignee: Hydro-Quebec, Montreal, Quebec (CA)

( * ) Notice: Subject to any disclaimer, the term of this patent is extended or adjusted under 35 U.S.C. 154(b) by 214 days.

(21) Appl. No.: 12/449,210

(22) PCT Filed: Feb. 18, 2008

(86) PCT No.: PCT/CA2008/000295
§ 371 (c)(1),
(2), (4) Date: Dec. 14, 2009

(87) PCT Pub. No.: WO2008/101321
PCT Pub. Date: Aug. 28, 2008

(65) Prior Publication Data
US 2010/0101059 A1    Apr. 29, 2010

(30) Foreign Application Priority Data
Feb. 20, 2007    (CA) .................................. 2577878

(51) Int. Cl.
*B66F 19/00* (2006.01)
(52) U.S. Cl. ............... 294/209; 294/191; 269/3; 269/6
(58) Field of Classification Search ............... 294/19.1, 294/24, 26, 82.34, 174, 191, 209; 114/221 R, 114/230.1; 269/3, 6, 95, 143
See application file for complete search history.

(56) References Cited

U.S. PATENT DOCUMENTS

| | | | |
|---|---|---|---|
| 2,246,630 A | | 6/1941 | Johnson |
| 2,543,862 A | * | 3/1951 | Manahan ................ 294/174 |
| 2,979,013 A | | 4/1961 | Whittall |
| 3,436,795 A | | 4/1969 | Hill |
| 3,913,515 A | * | 10/1975 | Hernsjo et al. ............. 294/209 |
| 5,192,105 A | * | 3/1993 | Walker ................ 294/119.2 |
| 5,415,446 A | | 5/1995 | Olson et al. |
| 5,622,399 A | | 4/1997 | Albright et al. |
| 5,742,220 A | * | 4/1998 | Scherer ............. 337/171 |
| 5,773,777 A | * | 6/1998 | Scherer ............. 218/1 |
| 5,813,486 A | * | 9/1998 | Smith et al. ............. 182/3 |
| 5,820,181 A | | 10/1998 | Le Noach |
| 5,861,595 A | * | 1/1999 | Wood et al. ............. 218/12 |
| 6,027,154 A | * | 2/2000 | Costa ............. 294/82.21 |
| 6,154,311 A | * | 11/2000 | Simmons et al. ........... 359/359 |
| 6,412,432 B1 | | 7/2002 | White et al. |

FOREIGN PATENT DOCUMENTS
CA    2 254 123 A1    3/2000
* cited by examiner

*Primary Examiner* — Saul Rodriguez
*Assistant Examiner* — Stephen Vu
(74) *Attorney, Agent, or Firm* — Muirhead and Saturnelli, LLC

(57) ABSTRACT

A hooking device attaches an equipment like a fall limiter to an anchorage structural element by means of a stick. The device comprises an elongated member to which the equipment is attachable. A hooking head slides along the elongated member. The hooking head has a hook forming an opening in which the anchorage structural element is engageable. An actuating mechanism operates a locking element of the opening in response to a sliding of the hooking head with respect to the elongated member. A stick detachable fastening element is used to slide the hooking head with respect to the elongated member in response to a movement of the stick when the anchorage structural element is engaged in the opening.

22 Claims, 11 Drawing Sheets

STICK OPERABLE HOOKING DEVICE

FIELD OF THE INVENTION

The invention relates to a stick operable hooking device for attaching equipment like a fall limiter to an anchorage structural element, as used for safety purposes by a worker having to perform works high up. The hooking device may also be used for any application requiring hanging up an equipment, for example a rope, an apparatus, from a distance or high up by means of a stick.

BACKGROUND

To work high up or to climb up or down along a pole, electric linemen, jointers and repairmen or other workers usually have to use protection equipment against accidental falls.

One possible equipment consists of a harness worn by the worker and a strap system attached to the harness, allowing to form a restraining loop or belt around the pole. In case of a fall, the loop tightens around the pole and prevents the free fall of the worker. In order to increase the grip of the loop to the pole in situation of falling, grapples can be added to the strap system. The grapples however reduce the mobility of the workers on pole. Furthermore, the crossing of obstacles such as telephone or cable line cables forces the worker to perform many buckle-unbuckle movements of the strap system so that he/she is always fastened in accordance with safety standards.

Another possible equipment, used or not in complement to the aforesaid equipment, consists of a fall limiter used to limit the effort of an eventual fall to an acceptable level on the body of the worker. It comprises an anchorage point, a harness worn by the worker, and an anti-fall linking system. The linking system can take the form of a glider on a rope (commonly called lifeline), a lanyard with an energy absorber, a reel. One problem with the current anti-fall linking systems resides in finding an appropriate anchorage point on the work structure. Another problem resides in attaching the linking system to the structural element providing the anchorage point located in general high up. Furthermore, in the case of electrical lines, another problem resides in eliminating or else reducing the possible electrocution dangers.

SUMMARY

An object of the present invention is to provide a stick operable hooking device for attaching an equipment, like a fall limiter, to an anchorage point.

Another object of the present invention is to provide a hooking device having a weight allowing manipulating and operating it at the end of a stick of many feet, for example forty feet.

Another object of the present invention is to provide a hooking device that may be attached to various structural elements providing anchorage points, in particular a transformer bracket, a stop bolt, a brace.

Another object of the present invention is to provide a hooking device that can support a load effort of many kilonewtons depending on the equipment used or the expected use, for example 12 kN, 18 kN, 22.5 kN, or more.

Another object of the present invention is to provide a hooking device that can unhook only by appropriate operation from the user when it is set in position.

Another object of the present invention is to provide a hooking device having a reliable functioning over en extended range of temperature and conditions of use.

Another object of the present invention is to provide a hooking device that can exhibit insulating properties reducing electrocution risks when used near live electrical lines.

According to an aspect of the invention, there is provided a hooking device for attaching an equipment to an anchorage structural element by means of a stick, comprising:

- an elongated member having lower and upper ends;
- an attachment means for attaching the equipment to the lower end of the elongated member;
- a hooking head sliding along the elongated member between raised and lowered positions with respect to the upper end of the elongated member, the hooking head having a hook projecting on one side of the elongated member and bending towards the lower end of the elongated member so as to form an opening in which the anchorage structural element is engageable;
- a mobile locking element for locking the opening of the hook, operable between closed and opened positions in which the mobile element respectively locks and clears the opening;
- an actuating means for actuating the mobile element, responsive to a sliding of the hooking head with respect to the elongated member so as to actuate the locking element into closed and opened position as the hooking head respectively slides towards the raised position and the lowered position; and
- a fastening means detachable from the stick for sliding the hooking head with respect to the elongated member in response to a movement from the stick when the anchorage structural member is engaged in the opening.

BRIEF DESCRIPTION OF THE DRAWINGS

A detailed description of preferred embodiments of the invention will be given herein below with reference to the following drawings, in which like numbers refer to like elements.

DETAILED DESCRIPTION OF THE PREFERRED EMBODIMENTS

Figure 11:
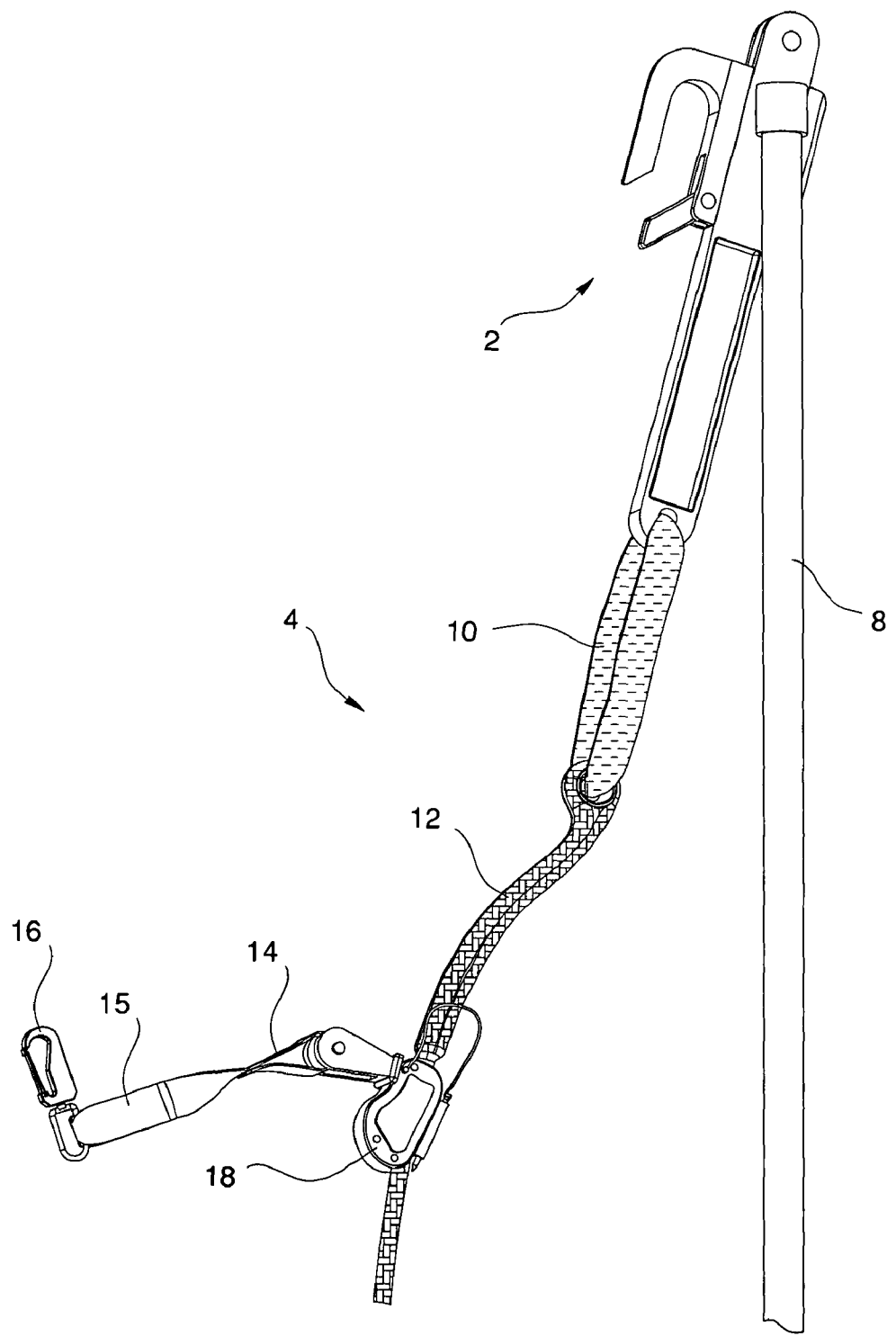
FIG. 11 is a side view of a hooking device mounted at the end of a stick and to which a fall limiter is attached.

Referring to FIG. 11, the hooking device 2 is designed for attaching an equipment like a fall limiter 4 to an anchorage structural element 6 (see for example in FIGS. 12, 13 and 14) by means of a stick 8. In the illustrated case, the fall limiter 4 is of "lifeline" type and is made of a strap 10 that can be arranged for use as a fall indicator, a rope 12 forming the "lifeline", and a lanyard 14 provided with a hook 16 intended to be fastened to the worker, for example to a harness or belt worn by the worker. The lanyard 14 may be provided with an energy absorber 15. A glider 18 allows the lanyard 14 to glide along the rope 12 and comprises a stop mechanism adjusted to arrest the gliding should the worker fall. The hooking device 2 may well be used with other types of fall limiters, for example with a reel or self-retractor (not shown), equipped with or deprived of energy absorbers. The hooking device 2 may also be used for attaching other kinds of equipment from a distance by means of a stick, for example a tool, a simple rope, a chain, an apparatus, etc.

Figure 1:
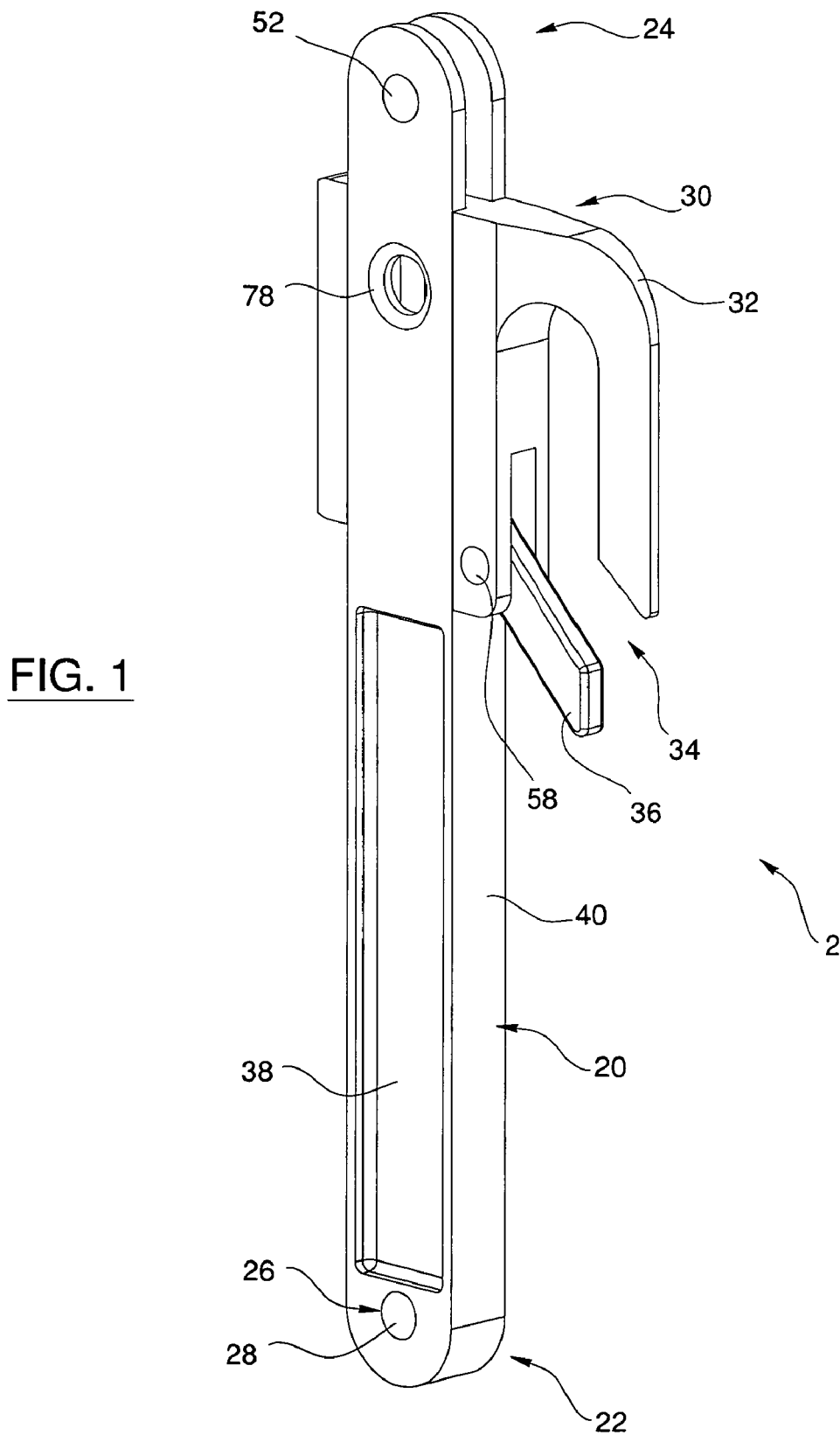
FIG. 1 is a perspective view of a stick operable hooking device.
Figure 12:
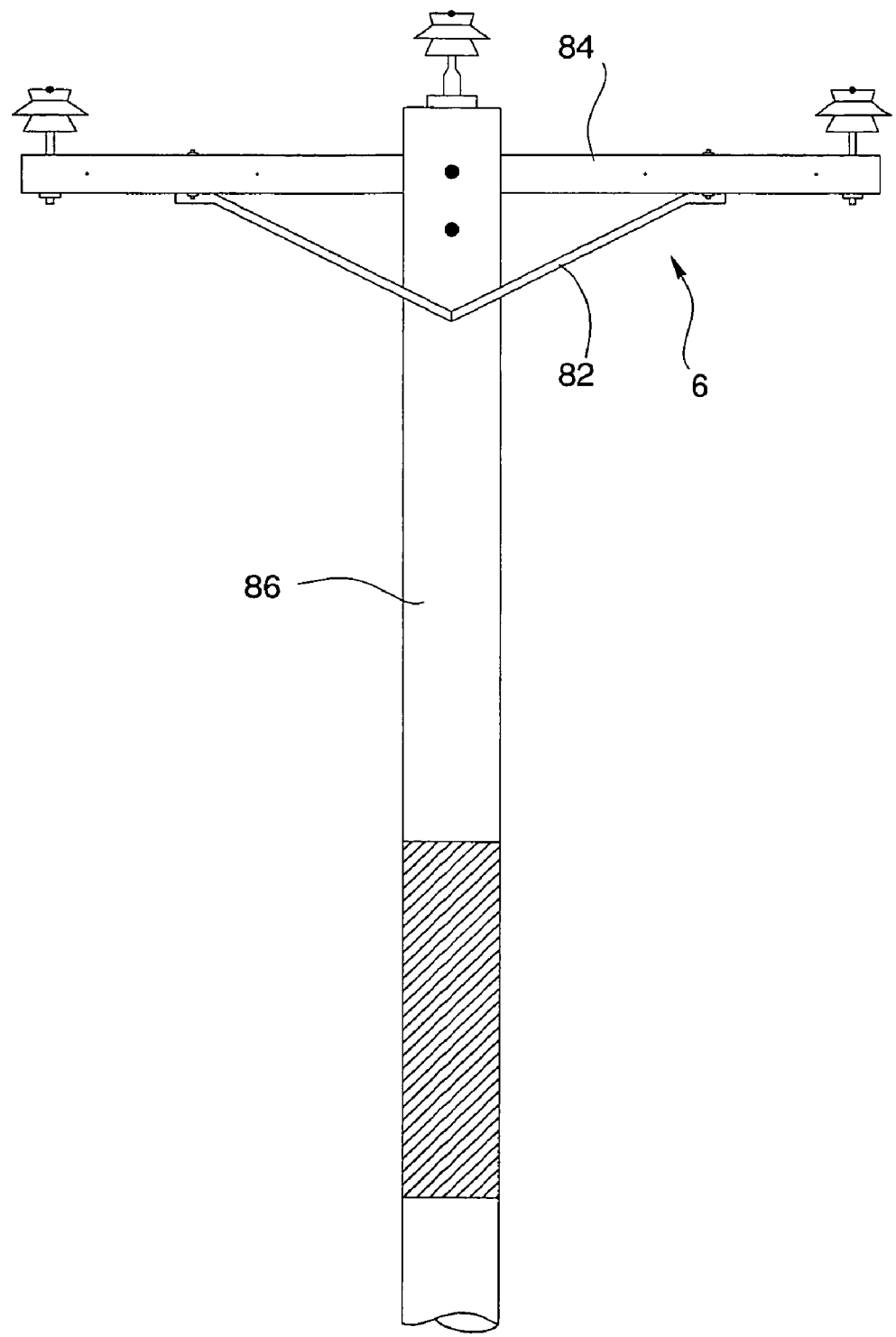
FIGS. 12, 13 and 14 are views of structures to which the hooking device can be hooked.
Figure 13:
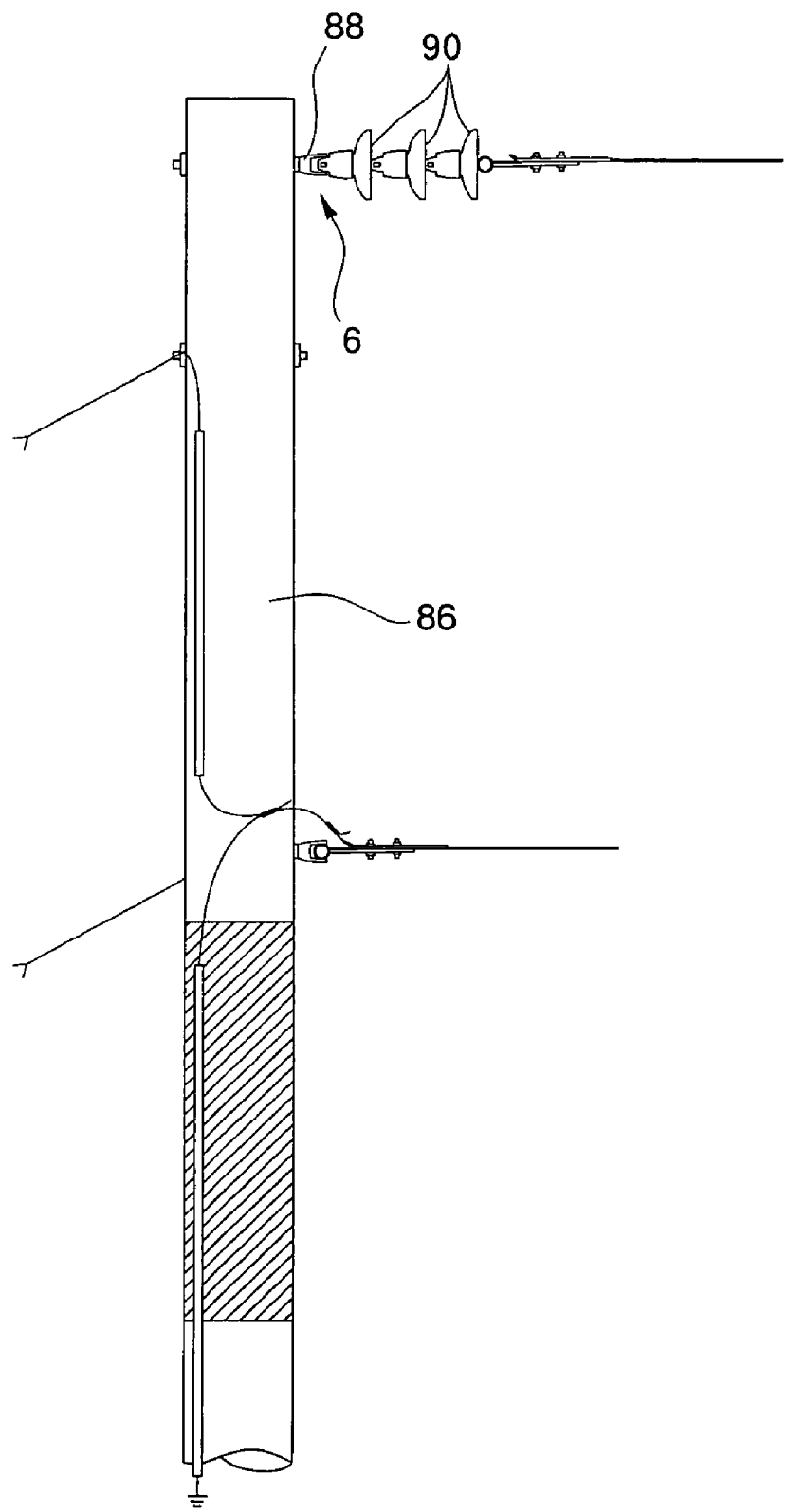
Figure 14:
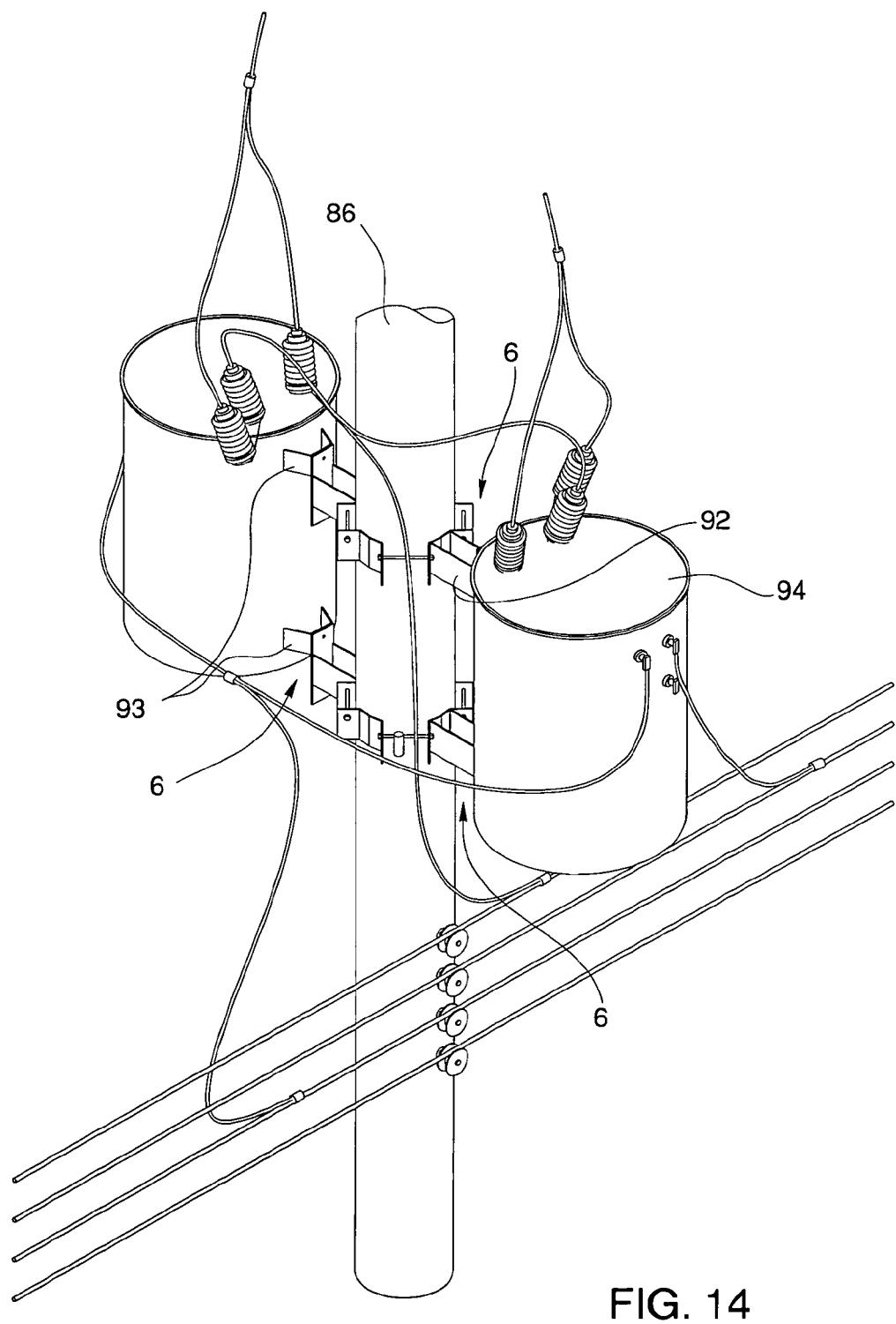

Referring to FIG. 1, the hooking device 2 comprises an elongated member 20 having lower and upper ends 22, 24. The hooking device 2 also comprises an attachment element 26 for attaching the fall limiter 4 to the lower end 22 of the elongated member 20. The attachment element 26 may be made of a simple eye 28 extending through the elongated member 20 between opposite faces of the elongated member 20, for allowing passage of the strap 10, a snap hook (not shown) or any other fastener able to pass in the eye 28. The eye 28 may exhibit chamfered openings on each one of the opposite faces of the elongated member 20 to limit the possible wear of the strap 10. The eye 28 may be disposed near the lower end 22 of the elongated member 20 such as illustrated, so as to be well clear and that the weight of the lifeline has a lever effect for maintaining the elongated member 20 in axis close to vertical. The eye 28 may also be disposed farther from the end if desired. As illustrated, the elongated member 20 is straight and rectangular with rounded ends, but it may also be bent and exhibit projecting or recessed portions with respect to its longitudinal axis. For example, a lower arm 40 of the elongated member 20 may have opposite faces exhibiting longitudinal recesses 38 that may contribute to reduce the weight of the hooking device 2. The lower arm 40 may be dielectric in order to allow using the hooking device 2 near electrical lines or sources. Such a feature is in particular suggested whatever the intended use of the hooking device 2, in case where the device 2 would be used near electrical sources. The other parts of the hooking device 2 may also be dielectric if desired, but it is especially the lower arm 40 that is recommended in this respect because of the clearance that it provides between the lifeline and the anchorage structural element 6 (FIGS. 12, 13 and 14). The attachment element 26 may take other forms than that of an eye, provided that it allows appropriate attachment of the strap 10 or another fastener of the lifeline or the considered equipment.

Figure 3:
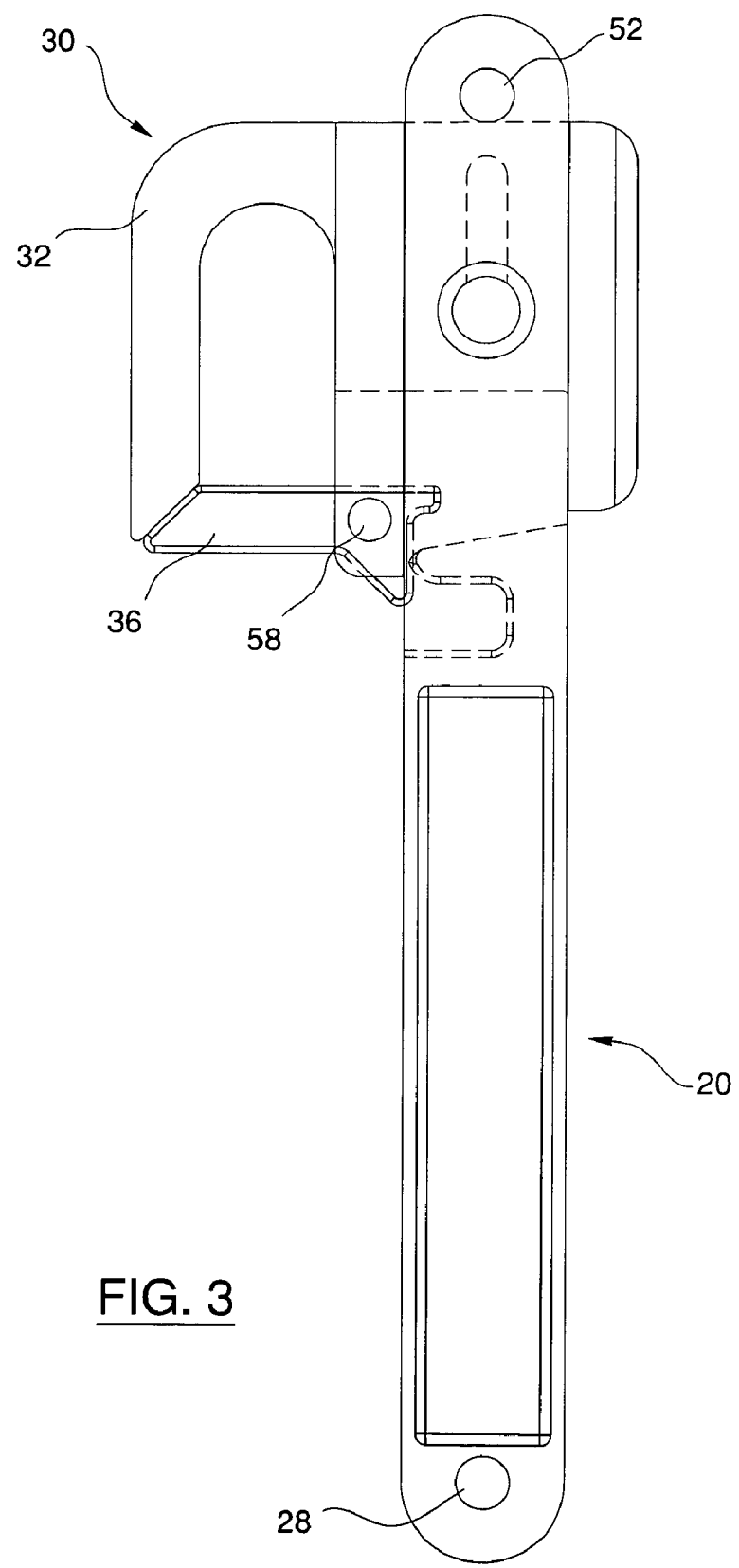
FIGS. 3, 4 and 5 are side views of a hooking device, in closed position, opened position and during opening or closing.
Figure 4:
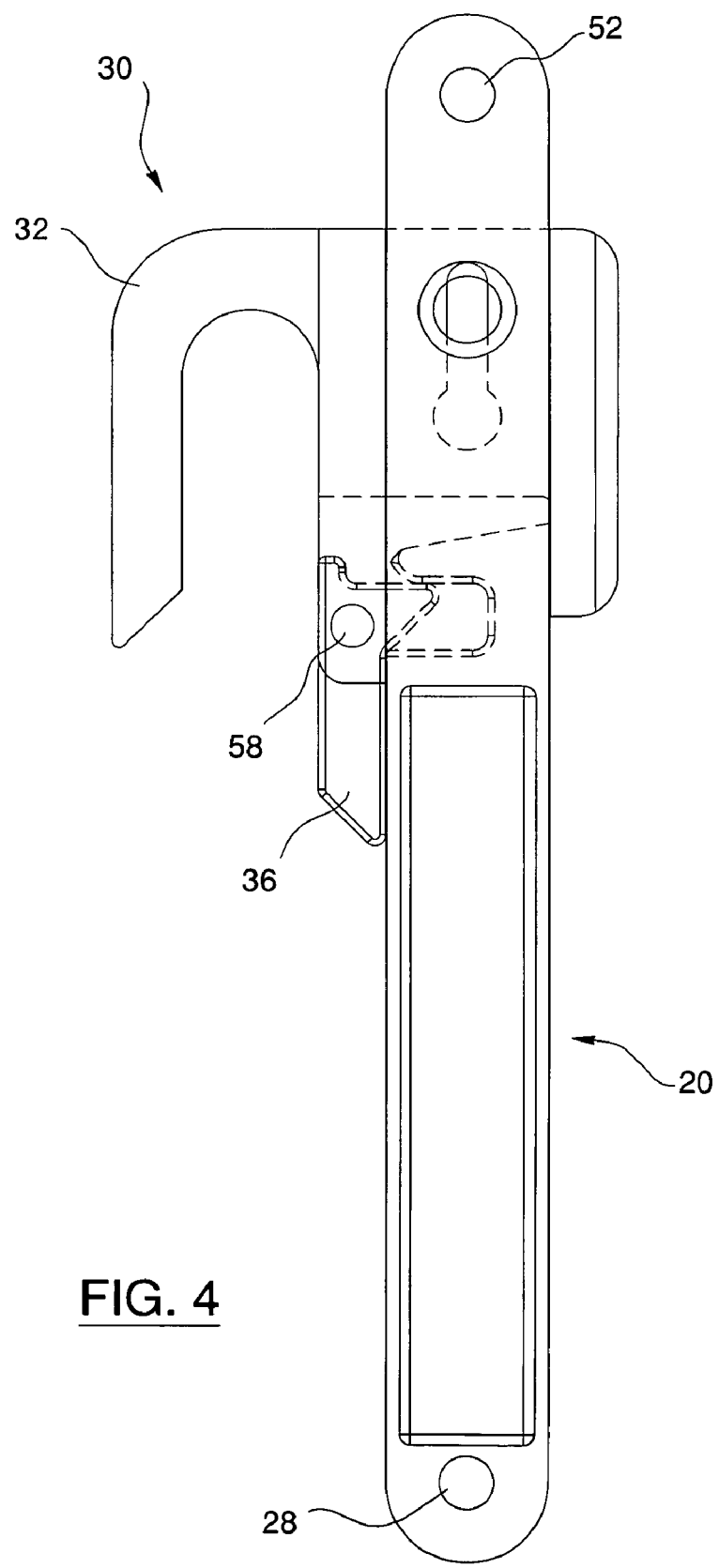

The hooking device 2 has a hooking head 30 sliding along the elongated, member 20 between a raised position (as illustrated in FIG. 3) and a lowered position (as illustrated in FIG. 4) with respect to the upper end 24 of the elongated member 20. The hooking head 30 has a hook 32 projecting on a side of the elongated member 20 and bending towards the lower end 22 of the elongated member 20 so as to form an opening 34 in which the anchorage structural element 6 (as illustrated in FIGS. 12, 13 and 14) is engageable.

Figure 2:
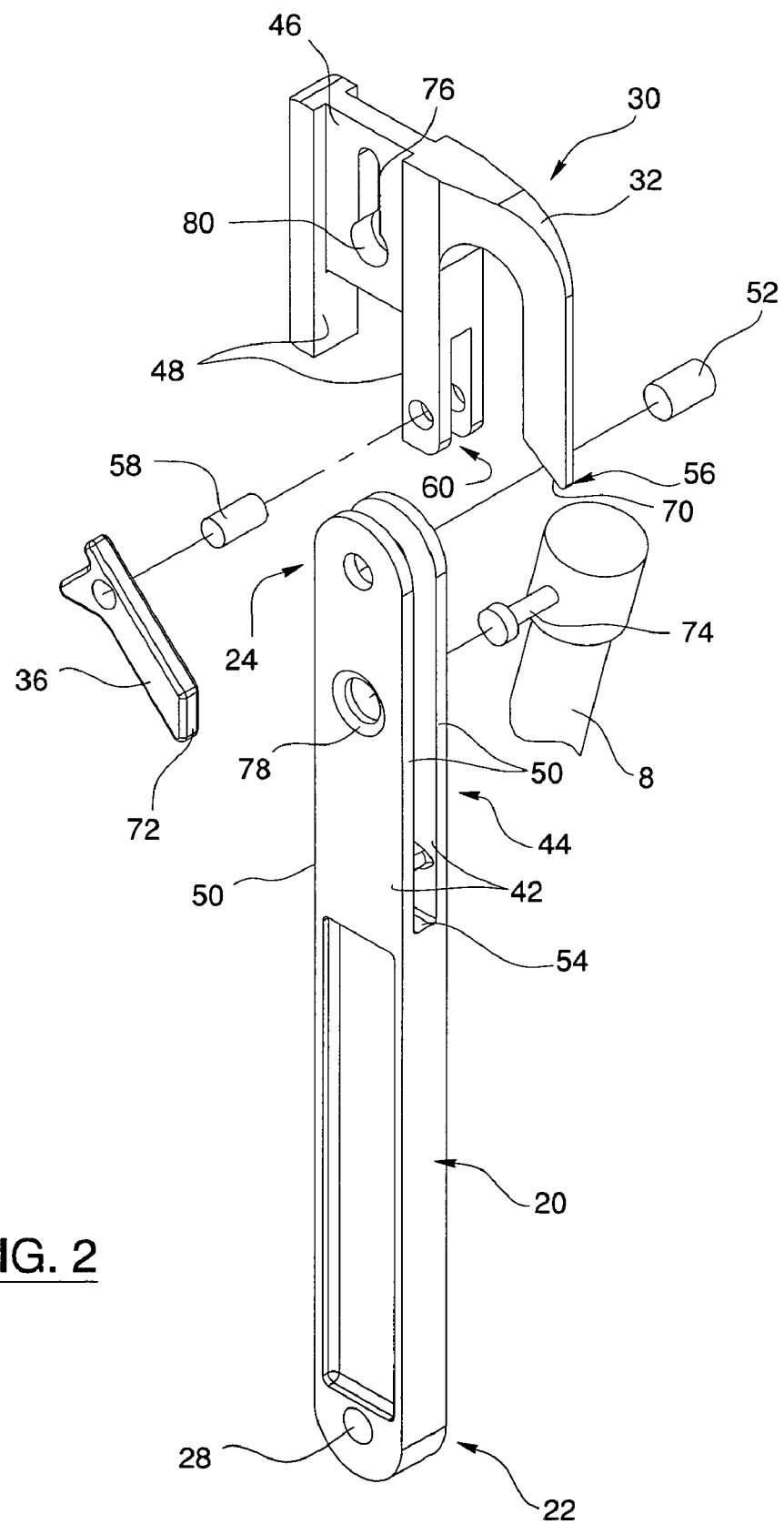
FIG. 2 is an exploded perspective view of a hooking device and an end of a stick for operating it.

Referring to FIG. 2, two upper legs 42 of the elongated member 20 may form a longitudinal fork 44 in which a central plate 46 of the hooking head 30 slides. The hooking head 30 comprises guiding shoes 48 disposed on both sides of the central plate 46 and pressing against opposite sliding surfaces 50 on both sides of the fork 44 so as to guide the sliding of the hooking head 30 with respect to the elongated member 20. The elongated member 20 may comprise a pin or gudgeon 52 passing through the fork 44 near the upper end 24. The pin 52 may be used both for strengthening the fork 44 after assembly of the hooking head 30 on the elongated member 20, and to form a stop limiting the sliding of the hooking head 30 in the raised position, as illustrated in FIG. 3. The base 54 of the fork 44 may also be used to form a stop limiting the sliding of the hooking head 30 in the lowered position as illustrated in FIG. 4. The pin 52 may have a cylindrical shape as illustrated or any other appropriate shape, for example half-cylindrical or tubular.

The arrangement allowing the hooking head 30 to slide with respect to the elongated member 20 may be constructed in different ways, for example by means of bearings, runners, slides (not shown). The fork 44 and the central plate 46 may be inverted on the pieces, i.e. the hooking head 30 could have the shape of a fork while the upper end 24 of the elongated member 20 would form the central plate sliding in the fork (not shown). The illustrated configuration is particularly resistant to efforts to which the hooking device 2 may be subjected in case of a fall of the worker. The hook 32 may have a thickness decreasing away from the central plate 46, so as to reduce the weight of the hooking device 2 and facilitate its operation in the vicinity of the anchorage structural element 6.

Referring back to FIG. 1, the hooking device 2 comprises a mobile locking element for locking the opening 34 of the hook 32, in the illustrated case formed of a latch 36, operable between a closed position (as illustrated in FIG. 3) and an opened position (as illustrated in FIG. 4) in which the locking element respectively locks and clears the opening 34. The latch 36 is pivotally mounted onto the hooking head 30 so as to be, on one hand liftable to press against a lower end 56 of the hook 32 and thus closing the opening 34 of the hook 32 as illustrated in FIG. 3, and on the other hand lowerable against the elongated member 20 and thus clearing the opening 34 of the hook 32 as illustrated in FIG. 4. The assembly of the latch 36 may be made by means of a gudgeon 58 used as a pivot for the latch 36 and engaging through a slot 60 in the hooking head 30 facing the lower end 56 of the hook 32. Although this assembly is simple and efficient, any other assembly allowing the latch 36 to pivot as required may be used if desired, even sideways instead of at the vertical. The locking element may take other forms, such that for example of a pin or rod retracting or sliding in the hooking head 30 or moving vertically in a carriage-like manner (arrangements not shown). Also, the locking element may be made by the hook 32 swinging on itself so that the lower end 56 of the hook 32 turns down against the body of the hooking head 30 so as to close the opening 34.

The hook 32 and the latch 36 may have respective complementary and bevelled contact surfaces 70, 72 to tightly close the opening 34 when the latch 36 is in closed position. The surfaces 70, 72 may form other arrangements, for example in order that the latch 36 partially engages in the hook 32 if desired.

Figure 6:
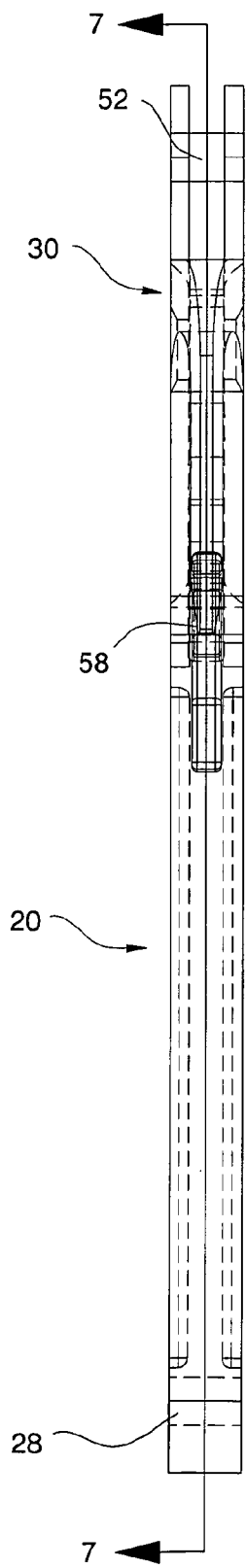
FIG. 6 is a front view of a hooking device.
Figure 7:
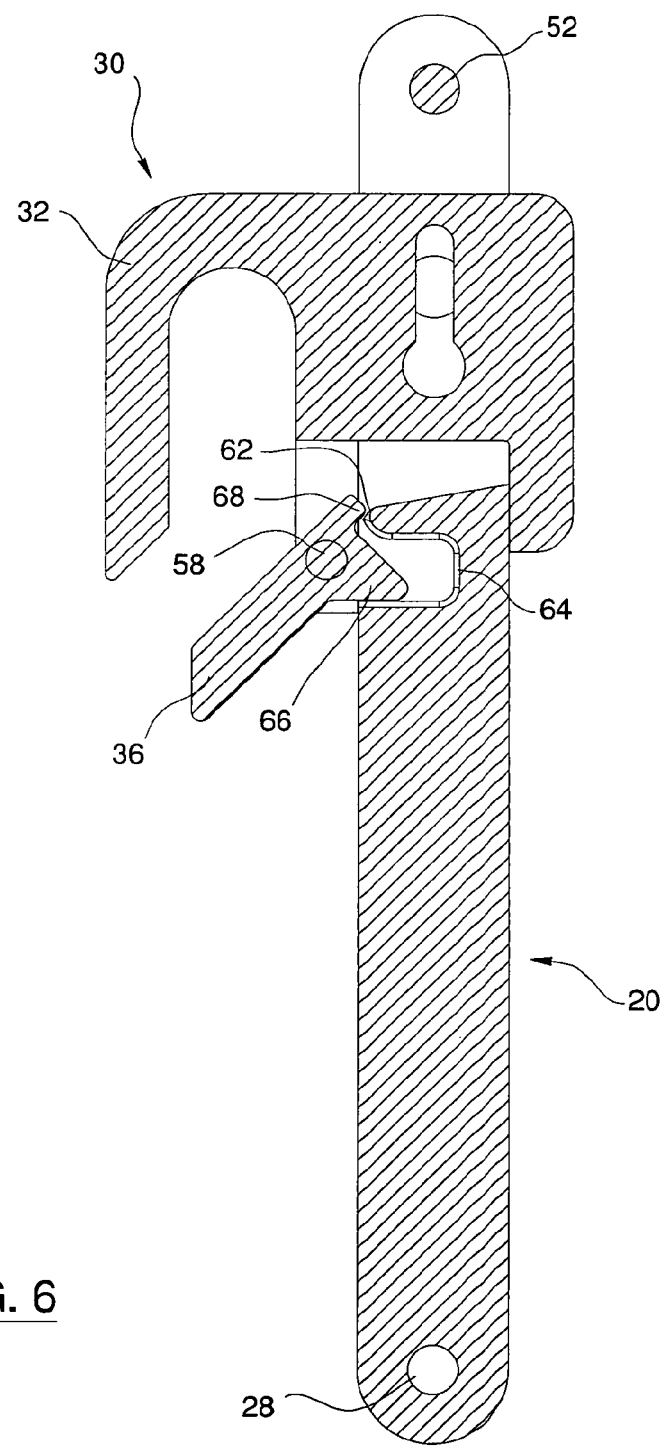
FIG. 7 is a cross-section view taken along line 7-7 in FIG. 6.

Referring to FIG. 7, which is a cross-section view taken along line 7-7 in FIG. 6, the hooking device 2 also comprises an actuating mechanism for the locking element, responsive to a sliding of the hooking head 30 with respect to the elongated member 20 so as to actuate the locking element in closed and opened position as the hooking head 30 respectively slides towards the raised position and the lowered position. In the case of a latch 36 as illustrated, the actuating mechanism may be made of a shoulder 62 followed by a recess 64 in the elongated member 20, and a tooth 66 projecting from a pivoting end of the latch 36.

As illustrated in FIG. 3, the tooth 66 presses against the shoulder 62 and maintains and locks the latch 36 in closed position when the hooking head 30 is slid towards the raised position.

Figure 5:
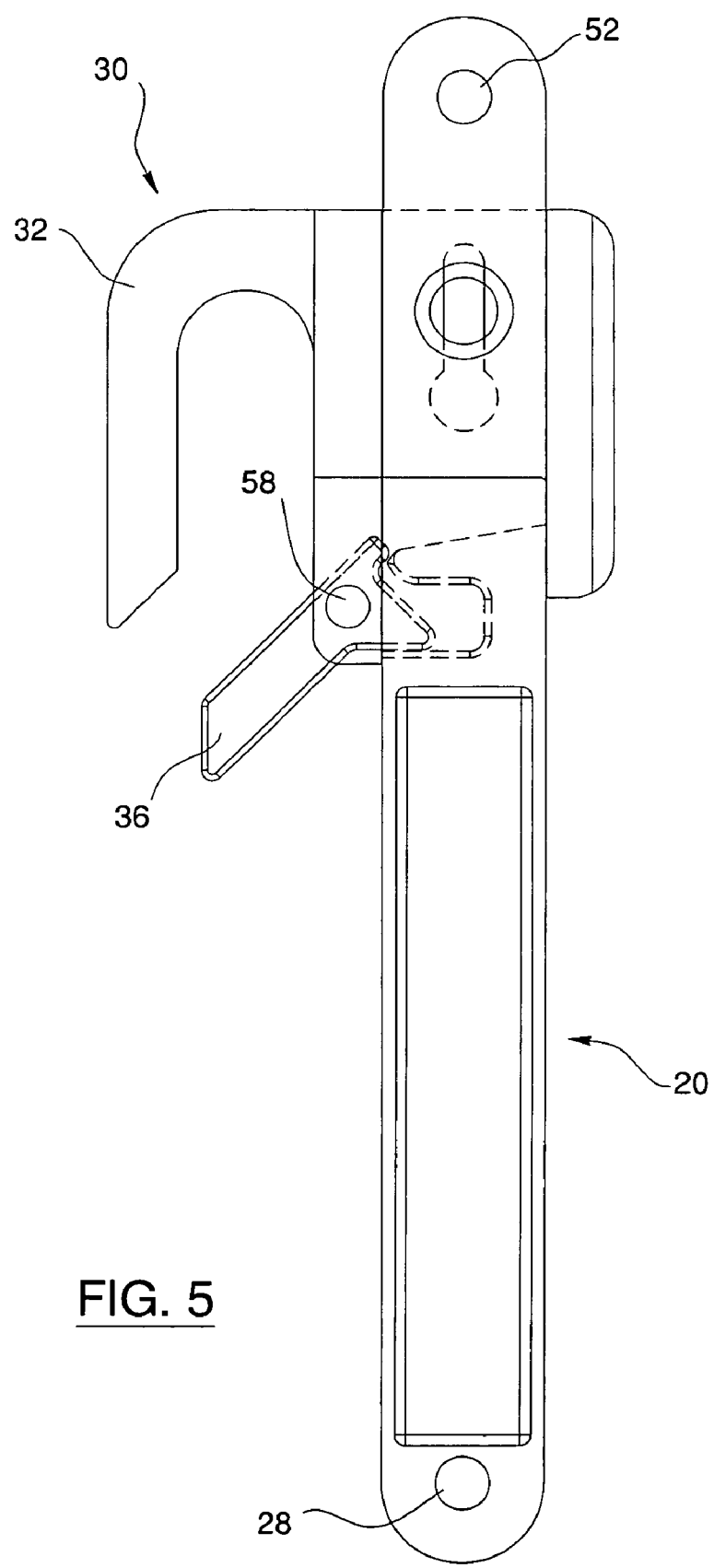

As illustrated in FIGS. 4 and 5, the tooth 66 engages in the recess 64 and swings the latch 36 in opened position when the hooking head 30 is slid towards the lowered position. A tongue 68 projecting above the tooth 66 may also contribute to swing the latch 36 by pressing against the shoulder 62 during the sliding.

The actuating mechanism may take other forms. It could for example be made of a rack system pivoting the latch 36 or moving the locking element in an appropriate manner. The actuating mechanism may operate at the level of the pivot axis of the latch 36 for example if the gudgeon 58 is solid with the latch 36. The actuating mechanism may operate at other levels depending on the configuration of the locking element if desired.

Referring to FIG. 2, the hooking device 2 is provided with an arrangement allowing a detachable coupling to the stick 8 for sliding the hooking head 30 with respect to the elongated member 20 in response to a movement of the stick 8 when the anchorage structural element 6 is engaged in the opening 34 (illustrated in FIG. 1).

In the case where the stick 8 is provided with a mounting pin 74 having a flat head projecting crosswise at an end of the stick 8, the arrangement used for the detachable coupling may be made of an elongated slot 76 longitudinally extending in the central plate 46 of the hooking head 30, and a hole 78 defined by two windows aligned with the respective legs 42 of the fork formed by the elongated member 20. The hole 78 has a size exceeding a width of the slot 76. The hole 78 is disposed so as to move along the slot 76 during the sliding of the hooking head 30 with respect to the elongated member 20. The slot 76 has a lower end exhibiting a widening 80 compatible with the hole 78 so as to allow a passage of the mounting pin 74 through the hole 78 when the hole 78 is aligned with the widening 80 of the slot 76. The head of the mounting pin 74 slidably locks against the lip of the slot 76 and prevents the mounting pin 74 from disengaging the hole 78 when the hole 78 is misaligned with respect to the widening 80 of the slot 76. The windows forming the hole 78 may have round and chamfered outer lips facilitating the insertion of the mounting pin 74. The slot 76 and the hole 78 may be inverted on the pieces without changing the fastening principle. Other attachment arrangements of the hooking device 2 to the stick 8 may be used if desired, although the foregoing one is particularly adapted for avoiding that the hooking device 2 might disengage from the stick 8 during the lifting and installation of the hooking device 2 onto the anchorage structural member 6. The weight of the lifeline attached to the hooking device 2 will contribute to maintain the hooking head 30 in raised position with respect to the elongated member 20 as illustrated in FIG. 3, and thus to maintain the latch 36 in closed position when it is set in position on the anchorage structural element 6. The opening of the latch 36 will require that the elongated member 20 be pushed upwardly, bringing thus the hooking head 30 in lowered position as illustrated in FIG. 4. FIG. 5 shows an intermediate position of the hooking device 2. The stick 8 may be telescopic or not, in wood, fiber, or any other desired material, according to the intended application or use of the hooking device 2. The stick 8 may also take the form of a controlled arm mounted on a possibly mobile base (not shown). The mounting pin 74 may have the form of a fitting screwable to the stick 8 or any other appropriate form, and even be integrated to the stick 8 if desired.

The elongated member 20 and the hooking head 30 may have pore-less smooth surfaces covered with a dielectric coating formed of a coating agent, varnish, stain or other, not only to be wear resistant but also to provide if necessary a good electrical insulation in particular by countering humidity penetration in the pieces. The elongated member 20 and the hooking head 30 may have rounded edges to avoid peeling of the coating used. The coating may exhibit a resistance to UV and have a yellow color so that the hooking device 2 is well visible. The yellow color is also often used to indicate that an accessory has dielectric qualities. The latch 36 may have a red color to allow the worker to easily distinguish if the latch 36 is in opened or closed position even from a distance. A certain friction between the mobile pieces of the hooking device 2 may be advantageous to reduce the involuntary movement of the pieces during operation and use.

The hooking device 2, when linked to a vertical lifeline 12 (and glider 18 with lanyard 14 and energy absorber 15), allows retaining a worker in case of an accidental fall. It can be used anywhere where a sufficiently resistant anchorage allows it. It may be used for work and inspection on bridges, dams, structures, pylons, poles or for any work high up where a safety anchorage is available or can be installed. For example, as illustrated in FIG. 12, the hooking device 2 may be attached to a "V" brace 82 linking a crossarm 84 to a pole 86. As illustrated in FIG. 13, the hooking device 2 may be attached to an anchor holder 88 of an insulator 90. As illustrated in FIG. 14, the hooking device 2 may be attached to a bracket 93 for a transformer 94 or a support 92 for a transformer 94.

Figures 8, 10:
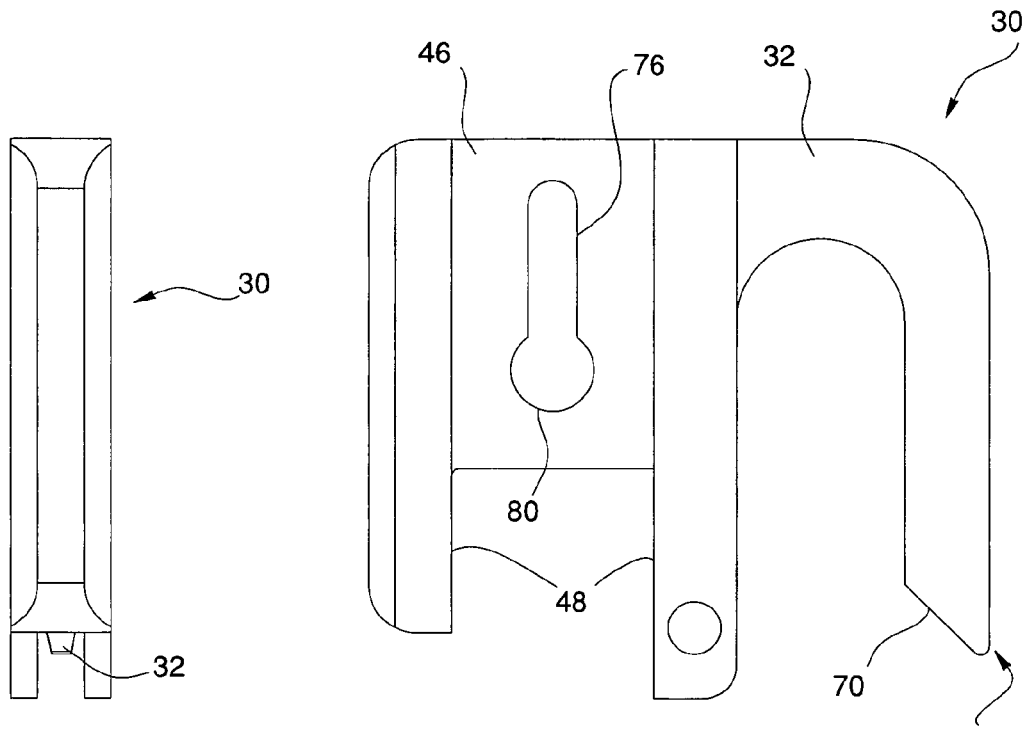
FIGS. 8, 9 and 10 are side, top and rear views of a hooking head of a hooking device.
Figure 9:
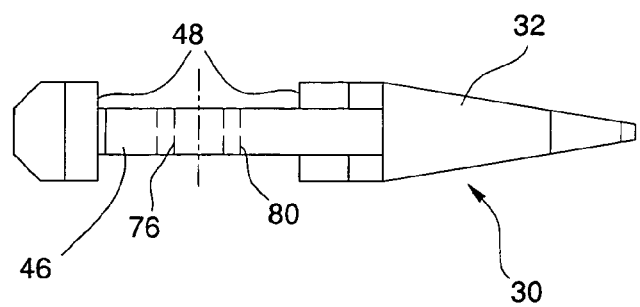

The use of the hooking device 2 by a worker allows him/her to be able to use freely his/her feet and hands when climbing up and down while being secured by a fall limiter 4 or any other anti-fall retaining system. The hooking device 2 may in particular replace conventional anti-fall systems of belt and strap type (not shown). The hooking device may be fastened to any other structure requiring attachment from a distance Referring to FIGS. 8, 9 and 10, an advantageous construction of the hooking head 30 is illustrated.

Referring to FIG. 2, the hooking device 2 may have a static mechanical tensile strength of 19 kN or even more in order to adequately resist in case of an accidental fall. The lower arm 40 may have a length of one foot (30 cm) or another length if desired so as to provide an electrically insulating length having a dielectric strength that can exceed for example 35 kV. Typically, the opening 34 of the hooking device 2 may have a width of about 2 inches (approx. 5 cm) and a depth of about 5 inches (approx. 10 cm) but it may well have other dimensions if desired. The eye 28 may have a diameter of about ¾ inch (approx. 2 cm) for the passage of the strap 10 of the lifeline 4 (shown in FIG. 11). The hole 78 may have a diameter of about 1¼ inch (approx. 3 cm) to operate the hooking device 2 by means of a pin 74 having standard dimensions fastened to the end of a stick 8, as used in the field of electrical installations for energy transport and distribution. The total weight of the hooking device 2 may be as low as 1.3 kg and even less, depending on the materials used and the desired tensile strength. The lightness of the device 2 allows in particular operating it with relative ease even at the end of a stick 8 having a length for example of 40 feet (approx. 12 m). In the illustrated configuration of the device 2, the pin 74 remains locked and solid with the device 2 until the installation and the closing of the hook 32. The latch 36 remains in closed position as long as it is not actuated by the pin 74. The illustrated configuration of the device 2 represents a very reliable configuration able to function over an extended range of temperature, for example −40° C. to +40° C.

Referring to FIG. 11, according to one operation mode of the hooking device 2, the hooking device 2 will be permanently connected to a rope 12 used as a vertical lifeline 4. A glider 18 mounted on the rope 12 is connected to a lanyard with an energy absorber 14 and then a hook 16. The hook 16 connects for example to a D-shaped dorsal ring on the equipment (not shown) worn by the worker. The hooking device 2 thus allows the worker, from the ground, to attach the lifeline 4 to an anchorage 6 (as shown in FIGS. 12, 13 and 14) at a height, for example 40 feet (approx. 12 m), using a stick 8, for example an insulating and telescopic stick. When the lifeline 4 is hanged to the anchorage 6 with the hooking device 2, the worker may attach to it the glider 18 with lanyard and energy absorber 14 linked to his/her harness (not shown). The glider 18 allows the lanyard 14 to be attached to the vertical lifeline 4 and to freely glide around the rope 12 when the worker climbs up or down. In case of a fall, the glider 18 locks on the vertical rope 12 and retains the worker in his/her harness. When appropriately electrically insulated, the hooking device 2 may be used near live distribution or transportation lines.

The hooking device 2 is particularly advantageous for linemen in distribution on wood poles so that they may climb up safely, freely without an anti-fall belt. The system of lifeline 4 attached by the hooking device 2 also allows them to get over obstacles found while climbing up and down the pole, like for example telephone or cable line cables, without having to continuously fasten and unfasten as it is currently the case with anti-fall systems of belt and strap type. The mobility of the worker is also improved and the worker no longer have to care about his/her safety in case of accidental fall when the hooking device 2 and the lifeline 4 are in function.

Referring to FIG. 2, the functioning of the hooking device 2 is relatively simple. The hooking device 2 may comprise only five pieces 20, 30, 36, 52, 58 among which two gudgeons 52, 58 and only three mobile and interconnected pieces 20, 30 and 36. The hooking device 2 may be made of vinyl ester-fiber glass composite or any other material preferably lightweight, resisting in particular to tensile stress and possibly dielectric.

Handling and operation of the hooking device 2 is just a matter of using a standard pin 74 fastened to a stick 8. This type of standard pin 74 is commonly used by linemen. In the illustrated configuration, the pin 74 must be inserted in the hole 78 when the hooking head 30 is in raised position with respect to the elongated member 20 (as shown in FIG. 3). When the pin 74 is inserted, an upward push of the pin 74 swings the latch 36 down and allows the hook 32 to open (as shown in FIG. 4). When the latch 36 is in opened position, the pin 74 no longer can be removed from the hooking device 2 so that the hooking device 2 cannot disengage from the stick 8 during the installation. When the anchorage structural element 6 (as shown in FIGS. 12, 13 and 14) is engaged in the hook 32, a small downward pressure of the pin 74 is all what is needed to actuate the latch 36 so as to close the opening 34. When the latch 36 is in closed position, the pin 74 can then be withdrawn from the hooking device 2. In closed position, the latch 36 will remain locked in the closed position as long as the pin 74 will not be reinserted in order to produce an upward pushing to swing the latch 26 opened.

While embodiments of the invention have been illustrated in the accompanying drawings and described above, it will be evident to those skilled in the art that modifications may be made therein without departing from the invention.

The invention claimed is:

1. A hooking device for attaching an equipment to an anchorage structural element by means of a stick, comprising:
   an elongated member having lower and upper ends;
   an attachment means for attaching the equipment to the lower end of the elongated member;
   a hooking head sliding along the elongated member between raised and lowered positions with respect to the upper end of the elongated member, the hooking head having a hook projecting on one side of the elongated member and bending towards the lower end of the elongated member so as to form an opening in which the anchorage structural element is engageable;
   a mobile locking element for locking the opening of the hook, operable between closed and opened positions in which the mobile locking element respectively locks and clears the opening;
   an actuating means for actuating the mobile locking element, responsive to a sliding of the hooking head with respect to the elongated member so as to actuate the mobile locking element into closed and opened position as the hooking head respectively slides towards the raised position and the lowered position; and
   a fastening means detachable from the stick for sliding the hooking head with respect to the elongated member in response to a movement from the stick when the anchorage structural member is engaged in the opening.

2. The hooking device according to claim 1, wherein the attachment means comprises an eye extending through the elongated member between opposite faces of the elongated member.

3. The hooking device according to claim 2, wherein the eye is near an extremity of the lower end of the elongated member.

4. The hooking device according to claim 1, wherein the elongated member has a lower arm having opposite faces exhibiting longitudinal recesses.

5. The hooking device according to claim 1, wherein the elongated member has a dielectric lower arm.

6. The hooking device according to claim 1, wherein:
   the elongated member comprises two upper legs forming a longitudinal fork; and
   the hooking head comprises a central plate sliding in the fork.

7. The hooking device according to claim 6, wherein the hooking head comprises guiding shoes disposed on both sides of the central plate and pressing against opposite sliding surfaces on both sides of the fork so as to guide the sliding of the hooking head with respect to the elongated member.

8. The hooking device according to claim 7, wherein the elongated member comprises a pin passing through the fork near the upper end of the elongated member, the pin forming a stop limiting the sliding of the hooking head in the raised position, the fork having a base forming a stop limiting the sliding of the hooking head in the lowered position.

9. The hooking device according to claim 6, wherein the hook has a thickness decreasing away from the central plate.

10. The hooking device according to claim 6, wherein the mobile locking element comprises a latch pivotally mounted on the hooking head so as to, on one hand be liftable to press against a lower end of the hook and thus close the opening of the hook, and on the other hand lowerable against the elongated member and thus clear the opening of the hook.

11. The hooking device according to claim 10, wherein the latch has a red color.

12. The hooking device according to claim 10, wherein the actuating means comprises a shoulder followed by a recess in the elongated member, and a tooth projecting from a pivoting end of the latch, the tooth pressing against the shoulder and maintaining the latch in closed position when the hooking head slides towards the raised position, the tooth engaging in the recess and swinging the latch in opened position when the hooking head slides towards the lowered position.

13. The hooking device according to claim 12, wherein the hook and the latch have respective substantially complementary and bevelled contact surfaces.

14. The hooking device according to claim 1, wherein the elongated member and the hooking head have pore-less smooth surfaces.

15. The hooking device according to claim 14, wherein the elongated member and the hooking head have rounded edges.

16. The hooking device according to claim 14, wherein the smooth surfaces are coated with a dielectric coating.

17. The hooking device according to claim 16, wherein the coating exhibits a resistance to UV.

18. The hooking device according to claim 16, wherein the coating has a yellow color.

19. The hooking device according to claim 1, wherein:
the stick is provided with a mounting pin having a flat head projecting crosswise from an end of the stick; and
the fastening means comprises a slot longitudinally extending in one of the hooking head and the elongated member, and a hole in the other one of the hooking head and the elongated member, the hole having a size exceeding a width of the slot, the hole moving along the slot during the sliding of the hooking head with respect to the elongated member, the slot having a lower end exhibiting a widening compatible with the hole to allow a passage of the mounting pin through the hole when the hole is aligned with the widening of the slot, the head of the mounting pin slidably locking against a lip of the slot and preventing the mounting pin from disengaging the hole when the hole is misaligned with respect to the widening of the slot.

20. The hooking device according to claim 19, wherein the elongated member comprises two upper legs forming a longitudinal fork, and the hooking head comprises a central plate sliding in the fork, the slot extending through the central plate, the hole being defined by two aligned windows in the respective legs of the fork.

21. The hooking device according to claim 20, wherein the windows have rounded and chamfered outer lips.

22. A hooking device for attaching equipment to an anchorage structural element, comprising:
an elongated member having lower and upper ends;
an attachment device that attaches the equipment to the lower end of the elongated member;
a hooking head sliding along the elongated member between raised and lowered positions with respect to the upper end of the elongated member, the hooking head having a hook projecting on one side of the elongated member and bending towards the lower end of the elongated member so as to form an opening in which the anchorage structural element is engageable;
a mobile locking element for locking the opening of the hook, operable between closed and opened positions in which the mobile locking element respectively locks and clears the opening;
an actuator that actuates the mobile locking element, responsive to a sliding of the hooking head with respect to the elongated member so as to actuate the mobile locking element into closed and opened position as the hooking head respectively slides towards the raised position and the lowered position; and
a fastening device that is detachable from a stick and that slides the hooking head with respect to the elongated member in response to a movement from the stick when the anchorage structural member is engaged in the opening.

* * * * *